Figure 1:
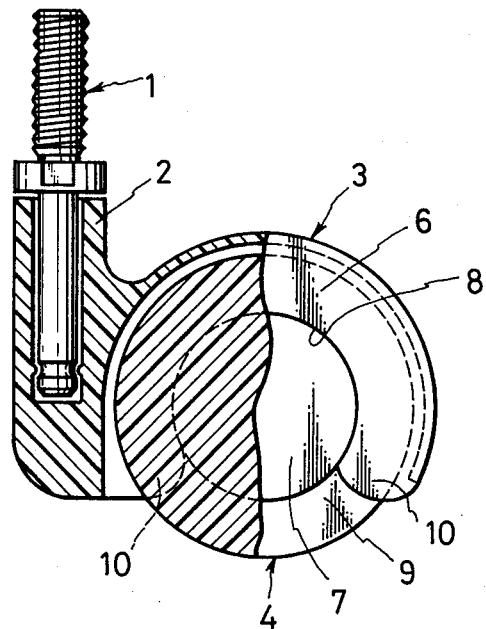

United States Patent [19]

Sugasawara

[11] 3,977,040
[45] Aug. 31, 1976

[54] CASTOR

[75] Inventor: Michio Sugasawara, Tokyo, Japan

[73] Assignee: Sugatsune Industrial Co., Ltd., Tokyo, Japan

[22] Filed: Feb. 27, 1975

[21] Appl. No.: 553,593

[52] U.S. Cl. .................... 16/45; 16/26; 16/30; 308/196
[51] Int. Cl.² ........................ B60B 33/00
[58] Field of Search ............ 16/18 R, 45 I, 46, 22, 16/23, 29, 30; 308/15, 16, 191, 196; 301/5.3, 5.7, 125

[56] References Cited
UNITED STATES PATENTS

| 19,369 | 2/1858 | Kinzer | 16/18 R |
|---|---|---|---|
| 1,892,845 | 1/1933 | McGrath | 16/30 |
| 1,900,672 | 3/1933 | Uhl | 16/18 R |
| 2,614,898 | 10/1952 | Adams | 308/196 |
| 3,528,635 | 9/1970 | Nightingale | 16/29 X |
| 3,691,590 | 9/1972 | Drabert | 16/18 R |
| 3,722,968 | 3/1973 | Bomberger | 308/191 |

FOREIGN PATENTS OR APPLICATIONS

| 249,376 | 2/1964 | Australia | 16/45 |
|---|---|---|---|
| 3,046 | 2/1898 | United Kingdom | 16/23 |

*Primary Examiner*—Werner H. Schroeder
*Assistant Examiner*—Moshe I. Cohen
*Attorney, Agent, or Firm*—George B. Oujevolk

[57] ABSTRACT

A castor for an article of furniture which comprises a connecting member connected to the article and having a cylindrical portion at the lower side thereof, a wheel having a pair of shafts projecting from both sides thereof, a main body having a generally tubular portion fitted rotatably to the cylindrical portion of the connecting member and an arc-shaped wheel-accommodating-and-bearing portion connected to the tubular portion and having arc-shaped side walls which receive the shafts of the wheel and having at the lower sides thereof resilient portions for preventing slip-off of the wheel.

2 Claims, 5 Drawing Figures

CASTOR

The present invention relates to a castor for an article of furniture and, more particularly, to a castor fitted to the leg of a table, chair or the like.

Heretofore, various kinds of castors have been proposed. However, the conventional castor has disadvantages in that it is relatively complicated in construction and therefore is not easy to assemble and, in addition, its wheel tends to get out of place when it is in use.

Therefore, it is an object of the present invention to provide a castor which is extremely easy and simple to assemble.

It is another object of the present invention to provide a castor whose wheel does not get out of place inadvertently when in use.

According to the present invention, there is provided a castor for an article which comprises a connecting member connected to the article and having a cylindrical portion at the lower side thereof, a wheel having a pair of shafts projected from both sides thereof, a main body having a generally tubular portion fitted rotatably to the cylindrical portion of the connecting member and an arc-shaped wheel-accommodating-and-bearing portion connected to the tubular portion, said wheel-accommodating-and-bearing portion having a pair of arc-shaped side walls spaced a predetermined distance apart thereby forming a recess therebetween for accommodating the wheel, said side walls holding the shafts of the wheel and extending downwardly to form at the lower ends thereof resilient portions for preventing slip-off of the wheel.

According to another aspect of the present invention, said shafts are formed integrally with the wheel and said side walls rotatably hold the shafts of the wheel.

According to still another aspect of the present invention, said shafts are formed separately from the felly of the wheel and said side walls of the main body fixedly hold the shafts and said wheel is made rotatable relative to the shafts.

Figure 3:
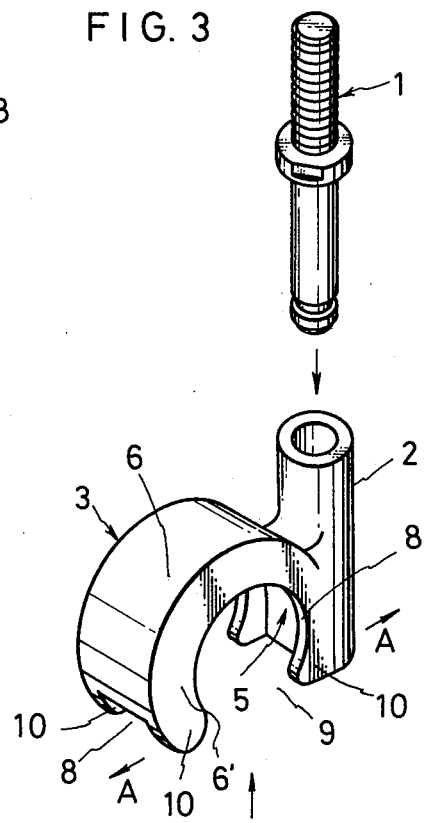
Figure 2:
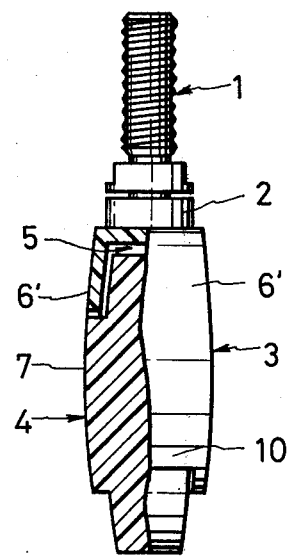
Figure 4:
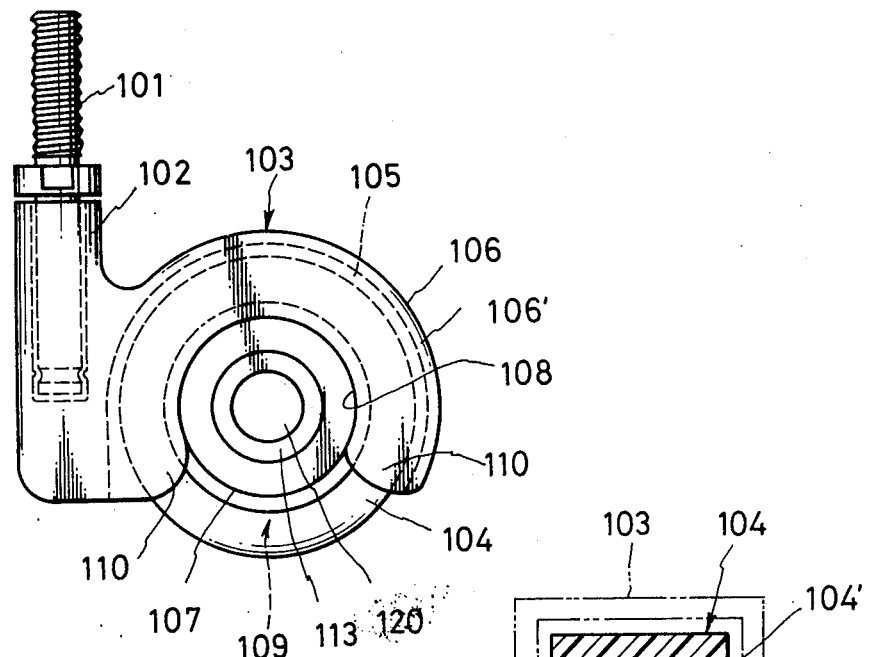
Figure 5:
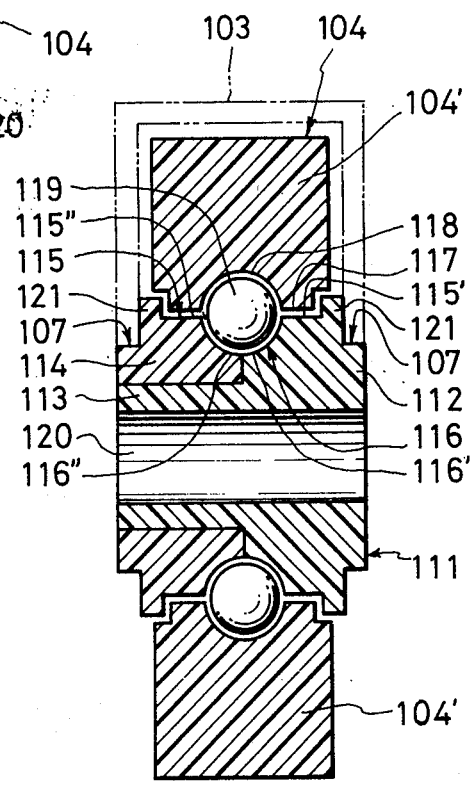

Other objects, features and advantages will be more apparent from the following description with reference to the attached drawings, in which:

FIG. 1 is a longitudinal side view partly in section of a castor according to the present invention, FIG. 2 is a longitudinal elevational view partly in section of the castor shown in FIG. 1, FIG. 3 is an exploded perspective view of the castor shown in FIG. 1, FIG. 4 is an elevational view of a modified form of a castor according to the present invention, and FIG. 5 is a longitudinal sectional view for use in the castor shown in FIG. 4.

Reference is now made to a castor shown in FIGS. 1, 2 and 3. Numeral 1 designates a screw rod to be fitted to a table, chair or the like. The screw rod 1 has a cylindrical portion at the lower side thereof. A main body 3 of the castor has a generally tubular portion 2 for rotatably receiving the cylindrical portion of the screw rod 1. The main body 3 also has an arc-shaped wheel-accommodating-and-bearing portion 6 connected to the generally tubular portion 2. The wheel-accommodating-and-bearing portion 6 is slightly larger in radius than a wheel 4 and has at the lower side thereof an opening 9 for receiving the wheel 4. The wheel-accommodating-and-bearing portion 6 also has a pair of arc-shaped side walls 6' spaced a predetermined distance apart thereby forming a recess 5 therebetween for accommodating the wheel 4. The side walls 6' form bearing recesses 8 for rotatably receiving a pair of shafts 7 projecting from both sides of the wheel 4 and integrally formed therewith. The side walls 6' further extend with the same radius of curvature as that of the bearing recesses 8 up to the position slightly lower than the upper half of the wheel 4 positioned in place to form resilient portions 10 for preventing slip-off of the wheel 4.

The main body 3 is preferably made of elastic material such as plastics.

With the construction mentioned above, the castor according to the present invention can be assembled as follows:

The wheel 4 having the shafts 7 projecting from thereby sides thereof is fitted into the accommodating recess 5 from thereunder while forcedly expanding the resilient portions 10 in the direction of the arrow A (FIG. 3) by the shafts 7 so that the shafts 7 of the wheel 4 may be rotatably fitted in the bearing recesses 8 of the side walls 6' of the main body 3. After the shafts 7 are fitted in the bearing recesses 8, the resilient portions 10 recover the original positions thereof due to elasticity and thus the bearing recesses 8 can securely embrace the shafts 7 of the wheel 4 thereaby preventing the wheel 4 from inadvertently slipping off therefrom downwardly.

In disassembly, the wheel 4 can be removed by forcedly pulling it out in the direction opposite to that taken when it is fitted, through the opening 9 against the action of the resilient portions 10.

Accordingly, the castor of this embodiment according to the present invention can change the wheel 4 easily and, in addition, is simple in construction and therefore can minimize troubles.

Now, another embodiment of the present invention will be hereinafter described with reference to FIGS. 4 and 5.

As shown in FIG. 4, the castor of this embodiment has a main body whose construction is the same as that of the main body of the embodiment shown with reference to FIGS. 1, 2 and 3, however, its wheel is not integrally made but is made up of several parts assembled.

Numeral 101 designates a screw rod to be fitted to a table, chair or the like. The screw rod 101 has a cylindrical portion at the lower side thereof. A main body 103 of the castor has a generally tubular portion 102 for rotatably receiving the cylindrical portion of the screw rod 101. The main body 103 also has an arc-shaped wheel-accommodating-and-bearing portion 106 connected to the generally tubular portion 102. The wheel-accommodating-and-bearing portion 106 is slightly larger in radius than a wheel 104 and has at the lower side thereof an opening 109 for receiving the wheel 104. The wheel-accommodating-and-bearing-portion 106 also has a pair of arc-shaped side walls 106' spaced a predetermined distance apart thereby forming a wheel-accommodating recess 105 therebetween for accommodating the wheel 104. The side walls 106' form bearing recesses 108 for fixedly receiving a pair of shafts 107 projecting from the both sides of the wheel 104. The side walls 106' further extend with the same radius of curvature as that of the bearing recesses 108 up to the position slightly lower than the upper half of the wheel 104 positioned in place to form resilient portions 110 for preventing slip-off of the wheel 104.

The main body 103 is preferably made of elastic material such as plastics.

In this embodiment, the wheel 104 is made up of several parts as shown in FIG. 5. The wheel 104 is composed of a felly 104', an axle 111 and a bearing 119. The felly 104' has on its inner surface 117 a groove 118 semi-circular in section for receiving the bearing 119. The axle 111 is composed of a male member 112 and a female member 114. The male member 112 has at its one end a reduced portion 113 and at its other end one of the shafts 107. The annular female member 114 has a bore therein for receiving the reduced portion 113 of the male member 112, and has at its one end the other of the shafts 107. The male and female members 112 and 114 have grooves 116' and 116" quadrantal in section on the outer surfaces 115' and 115" thereof, respectively. When these members 112 and 114 are assembled, the outer surfaces 115' and 115" cooperate to form the outer surface 115 of the axle 111, and the grooves 116' and 116" cooperate to form a groove 116 semi-circular in section on the outer surface 115 of the axle 111. When the felly 104' and the axle 111 are assembled together to form the wheel 104, the groove 118 on the felly 104' and the groove 116 on the axle 111 cooperate to retain the bearing 119 such as a ball bearing for smoothly rotating the felly 104'. The male member 112 also has an air core 120. The male and female members 112 and 114 have annular projections 121 on the outer surfaces 115' and 115" thereof, respectively, for preventing slip-off of the felly 104' fitted in place on the axle 111.

With the construction mentioned above, the wheel can be fitted in the main body and can be removed therefrom in the same manner as in the case of the first embodiment. Therefore, the castor thus constructed has the same features and advantages as that mentioned in the first embodiment. In addition, the wheel is composed of the axle and the felly rotatably fitted on the axle through the bearing, and therefore the felly, namely, the wheel can be smoothly rotated to enable the castor to display its full function. Furthermore, since the felly of the wheel is rotated relative to the axle which is fixedly fitted in the bearing recesses of the main body, wear does not occur on the axle and the bearing recesses and thereby a castor excellent in durability can be obtained.

What is claimed is:

1. A castor for an article comprising:

a. a connecting member (1) connected to said article and having a cylindrical connecting portion at the lower side thereof;

b. a wheel having a shaft projecting from each side thereof; and, c. a main body (3) having generally tubular portion (2) at one end fitted rotatably to said cylindrical connecting portion of said connecting member (1) and an arc-shaped wheel-accommodating-and-bearing portion (6) in excess of 180° extent connected to said tubular portion; said wheel-accommodating-and-bearing portion (6) having a pair of arc-shaped side walls (6') spaced a predetermined distance apart forming a recess therebetween for accommodating said wheel, said arc-shaped side walls (6') forming bearing recesses for receiving said shafts of said wheel and having resilient portions (10) at the lower ends thereof for preventing slip-off of said wheel, and said resilient portions (10) extending up to a position slightly lower than the upper half of said wheel placed in position.

2. A castor as set forth in claim 1, wherein said wheel is composed of an axle assembly, having a shaft projecting from each side thereof and a felly (104') rotatably mounted on said axle (111) assembly and wherein said bearing recesses receive said shafts of said axle assembly, the wheel (104) being composed of a felly (104') with an inner surface (117), an axle (111) and a bearing (119), the felly (104') having on its inner surface (117) a groove (118) semi-circular in section for receiving the bearing (119), the axle (111) being composed of a male member (112) and a female member (114), the male member (112) having at its one end a reduced portion (113) and at its other end one of the shafts, the annular female member (114) having a bore therein for receiving the reduced portion (113) of the male member (112), and has at its one end the other of the shafts (107), the male and female members (112, 114) having grooves (116', 116") on the outer surfaces (115', 115") thereof so that when these members (113, 114) are assembled, the outer surfaces (115', 115") cooperate to form the outer surface (115) of the axle (111), and the grooves (116', 116") cooperate to form a groove (116) semi-circular in section on the outer surface (115) of the axle (111) and, when the felly (104') and the axle (111) are assembled together to form the wheel (104), the groove (118) on the felly (104') and the groove (116) on the axle (111) cooperate to retain the bearing (119).

* * * * *